United States Patent [19]

Bäuerlein et al.

[11] 4,212,911

[45] Jul. 15, 1980

[54] PHOTOCATHODE FOR ELECTRORADIOGRAPHIC AND ELECTROFLUOROSCOPIC APPARATUS AND METHOD FOR MANUFACTURING SAME

[75] Inventors: Rudolf Bäuerlein, Erlangen; Dieter Uhl, Uttenreuth; Heinrich Diepers, Erlangen; Karl-Heinz Jablonski, Ebermannstadt, all of Fed. Rep. of Germany

[73] Assignee: Siemens Aktiengesellschaft, Berlin and Munich, Fed. Rep. of Germany

[21] Appl. No.: 889,524

[22] Filed: Mar. 23, 1978

[30] Foreign Application Priority Data

Apr. 6, 1977 [DE] Fed. Rep. of Germany ....... 2715483

[51] Int. Cl.[2] ........................ H01J 39/00; H01J 43/00; B32B 3/10; B05D 3/06

[52] U.S. Cl. .................................... 428/131; 428/469; 313/94; 313/101; 427/77; 427/78

[58] Field of Search ............... 428/131, 134, 137, 917, 428/469; 313/94, 101, 105 CM; 427/78, 36, 77

[56] References Cited

U.S. PATENT DOCUMENTS

| | | | |
|---|---|---|---|
| 3,517,246 | 6/1970 | Chester et al. | 313/101 X |
| 3,936,529 | 2/1976 | Roth | 427/78 X |
| 4,039,887 | 8/1977 | McDonie | 427/77 X |

*Primary Examiner*—George F. Lesmes
*Assistant Examiner*—Daniel R. Zirker
*Attorney, Agent, or Firm*—Kenyon & Kenyon

[57] ABSTRACT

A photocathode for electroradiographic and electrofluoroscopic apparatus which contains a stack arrangement of perforated foils of a material with a high atomic number, in particular, double layer perforated foils with two electrically conducting outer layers and an insulating layer arranged in between which obtains relatively high sensitivity and high resolution permitting its use in medical diagnostic apparatus is described along with method of manufacturing the photocathode.

7 Claims, 5 Drawing Figures

PHOTOCATHODE FOR ELECTRORADIOGRAPHIC AND ELECTROFLUOROSCOPIC APPARATUS AND METHOD FOR MANUFACTURING SAME

BACKGROUND OF THE INVENTION

This invention relates to a photocathode for electroradiographic and electrofluoroscopic apparatus in general and more particularly to such a photocathode which has improved sensitivity and resolution.

There is a trend in the field of medical technology to replace X-ray film, which is still generally used in diagnosis, by a more cost effective recording method, which also saves raw materials. Starting out from a method commonly used in xerographic copying technology, to develop and fix an electrostatic image by means of a contrast powder, one attempts in electroradiography (as the pertinent methods are referred to generally) to convert the information content of an X-ray beam which has penetrated the object to be imaged, into electric charges and then to concentrate and fix the latter on paper or a plastic film. In medical electroradiography, the further requirement of high sensitivity is added to the requirements found in copying technology, since the equipment developed for diagnostic purposes already has a sensitivity which corresponds to that of X-ray films with intensifier film, and since the patient should not be exposed to a radiation dose higher than heretofore. Due to this sensitivity requirement for the method, xeroradiography, which was developed from xerography, has been eliminated for general application in medical diagnostics.

Another method, so-called high pressure ionography, works according to the principle of an ionization chamber. The charge carriers, which are generated when X-rays pass through a gas space, are collected on a film. This known method has high sensitivity and definition, but, technically, is a less satisfactory solution. For, in order to obtain sufficiently high absorption of the radiation in the gas volume, a gas with a high atomic number, for instance, expensive xenon, must be used. Furthermore, it must be present in the chamber at an elevated pressure of, for instance, 5 bar. This places stringent requirements on the design of the chamber. In addition, the imaging chamber must be opened after each exposure to remove the charged film. The technique required is therefore relatively expensive and the total picture taking process requires considerable time.

Another method is the so-called low pressure ionography (Phys. Med. Biol. 18 (1973), pages 695 to 703). In this method, the external X-ray photo effect of a solid state photocathode is utilized for generating electric charge carriers. The emitted photo electrons are subsequently multiplied in the gas space of a suitable chamber by means of a Townsend discharge to such an extent that a developable electrostatic image is generated on paper or plastic foil. If, instead of these foils, an electroluminescent fluorescent screen is used for collecting the charges, then it is also possible with this method to display image sequences, i.e., moving pictures. Such a method is known as electrofluoroscopy. A known example of such, therefore is the X-ray image intensifier.

If a suitable filling gas which can be at atmospheric pressure is used in the chamber of such a photocathode, multiplication factors of $10^4$ can be achieved without difficulty. Because of the mismatch of the depth of penetration of the X-rays to the range of the emitted photo electrons, which is about 100:1, solid, plane photocathodes provide a quantum yield of about 0.5 to 1%. Quantum yield is understood here to mean the number of photo electrons emitted per incident X-ray quantum. With the quantum yield of the known photocathodes, it is therefore not possible to meet the requirements of medical technology as to sensitivity and resolution.

SUMMARY OF THE INVENTION

It is therefore an object of the present invention to provide a photocathode with higher sensitivity and higher resolution for low pressure ionography.

This problem is solved by constructing a photocathode which contains a stack arrangement of perforated foils of a material with a high atomic number.

The advantages of this photocathode are, for one, that through the use of a material with a high atomic number as the cathode material, a relatively strong absorption of the X-rays is achieved and thus, an accordingly high quantum yield. For, the quantum yield, i.e., the number of electrons generated by one X-ray quantum, is essentially the product of the photo absorption coefficient and the range of the electrons, and depends on the energy of the radiation and the atomic number of the cathode material. On the other hand, the quantum yield of the photocathode according to the present invention is substantially higher, due to the increase of its effective surface, because of the stack arrangement of the perforated foils, than the quantum yield of a comparable, solid plane cathode. For, the electron emission capacity of such a cathode increases proportionally to the increased surface, as long as the attenuation of the X-rays in these structures is still only of secondary importance.

The depth of penetration of X-rays generally used in medical diagnostics is, depending on the wavelength, between about 40 and 200 $\mu$m in a material with a high atomic number such as gold, while the range of the generated photo electrons is less than 2 $\mu$m. Therefore, only a small percentage of the photo electrons generated due to the external photo effect is utilized in the known, solid plane cathodes. Furthermore, since the quantum flux density at the cathode is given, it follows that an increase of the yield is possible by also utilizing the quanta absorbed and the photo electrons generated in plane electrodes in layers deeper than 2 $\mu$m. This can be accomplished providing a cathode which contains individual layers of predetermined thickness and ensuring, by an appropriate structure, that the photo electrons can emerge from such a layer structure. It is important in this connection that no substantial local relocation of the charges from their point of origin occurs, since, otherwise, the charge image produced would show a lack of definition. This requirement is met by a stack arrangement of perforated foils; the inidividual foils advantageously need not be adjusted here relative to each other and can advantageously be spaced from each other about 10 $\mu$m to 1 mm.

The thickness of the perforated foils is advantageously chosen less than ten times the range of the photo electrons in the foil material. It is preferably smaller than or equal to twice the range. Then the major part of the photo electrons can emerge from these foils.

If the stack arrangement contains so many perforated foils stacked on top of each other that their overall thickness is a multiple of the depth of penetration of the X-rays, for instance, at least twice the value and preferably, at least five times the range in the foil material, then a particularly high quantum yield is obtained due to the external photo effect, since, then, practically all photo quanta can be utilized on the one hand, and, on the other hand, the major part of the photo electrons generated in the absorption can also get out at the same time, i.e., the major part is emitted.

According to a further embodiment of the photocathode in accordance with the present invention, the transparency of the individual perforated foils, i.e., the portion of the surface taken up by the holes as compared to the total surface of a perforated foil, is advantageously at least 30% and preferably, at least 50%. In this manner the charge carriers generated due to the external X-ray photo effect will be less likely to impinge on the areas developed between the holes and therefore will be less likely to get lost for the generation of the image.

For drawing off the charge carriers produced in the stak arrangement of the photocathode according to the present invention into the surrounding gas, a sufficiently high field gradiant must be provided at the perforated foils. This field gradiant is advantageously generated by potentials of different height on the front and back sides of the perforated foils. If such foils are stacked, however, an excessively high overall potential can result. According to a further embodiment of the photocathode in accordance with the present invention, the field gradiant is therefore produced by designing each perforated foil as a double layer with an interposed insulating layer and by providing a potential gradiant between these two layers.

According to the present invention, for preparing such double layer perforated foils, a simple perforated foil is first provided with an insulating layer on one side. Then, the parts of the insulating layer covering the holes of the foil are removed and, subsequently, an electrically conductive material is deposited on the free surface of the remaining parts of the insulating layer, for instance, by evaporation. A metal or a semiconductor material may be provided as the electrically conductive material. Preferably, the same material of which the simple perforated foil is made, is deposited on the free surface of the remaining parts of the insulating layer.

DETAILED DESCRIPTION OF THE INVENTION

Figure 1:
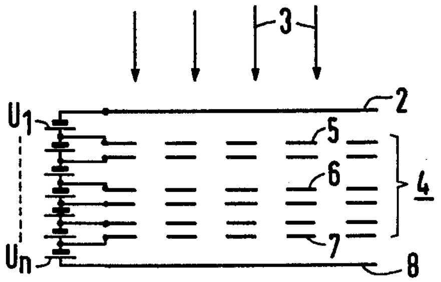
FIG. 1 is a diagrammatic illustration of an X-ray photocathode according to the present invention.

FIG. 1 shows in schematic cross section, the construction of an X-ray photocathode according to the present invention. The illustrated photocathode is suitable for a diagnostic X-ray system working on the basis of low pressure ionography and has a relatively high quantum yield, utilizing the external X-ray photo effect. The photocathode, of which only a part is shown in the figure, is to be arranged in a chamber (not shown in the figure) filled with a suitable gas, e.g., argon, at atmospheric pressure. The photocathode contains an entrance window 2, through which X-rays, represented by individual arrows 3, can enter a stack 4 of perforated double layer foils. The entrance window 2 therefore consists advantageously of material highly transparent for X-rays such as, for instance, aluminum, beryllium or a plastic. It serves at the same time as an electrode. If the entrance window 2 consists of insulating material, a thin layer of an electrically conductive material such as aluminum is applied to it, for instance, by sputtering; i.e., it is deposited by cathode sputtering. The layer thickness of this deposited material may be approximately 1 μm. Only three perforated double layer foils 5 to 7 are indicated in the figure, although a practical embodiment of the stack 4 contains a substantially larger number of such perforated double layer foils, say 20 to 50. The perforated foils 5 to 7, the detail design of which is shown in FIGS. 2 to 5 consist advantageously of a material with a high atomic number such as gold, because of the required high absorption of the X-rays. They may also consist of nickel or copper which is gold plated. The perforated double layers are arranged parallel to each other and to the entrance window 2 and are spaced from each other. Their transparency, i.e., the portion of the total area of the perforated foil which is taken up by its holes, is advantageously relatively high and is at least 30% and preferably at least 50%. The perforated double layer foils may, for instance, be 3 to 10 μm thick and have a mutual spacing of about 0.3 to 1 mm.

By using such a stack 4 of perforated foils, the geometric dimensions of which are matched to the range of the photo electrons, a relatively high quantum yield can be obtained. The individual foils, on the one hand, largely absorb the X-rays, and, on the other hand, due to their adequate transparency, let the charges which are produced directly or indirectly in the filling gas through, so that they can be collected on a suitable image carrier 8 and furnish an electrostatic image of the intensity distribution of the X-radiation. To this end, a sufficiently high field gradiant at the perforated foils of the stack is necessary. This gradiant is advantageously produced by potentials of different heights on the front and back sides of each perforated double layer foil as well as at the entrance window 2 and the image carrier 8. The potentials, which are designated in the figure with $U_1$ to $U_n$, add up to an overall potential.

Figure 2:
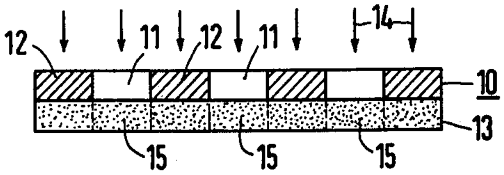
FIGS. 2 and 3 and 4 and 5, respectively, illustrate two variants of a method for manufacturing perforated foils for such a photocathode.
Figure 3:
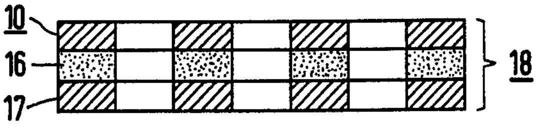

A method for manufacturing such a perforated double layer foil is indicated in cross sectional views of FIGS. 2 and 3. One starts out with a simple perforated gold foil 10 prepared by a known electroplating technique. A simple perforated foil is understood here to be a foil which consists of a single layer and to which no other layers have been applied. According to one embodiment, such a perforated gold foil is about 3 μm thick and has an area weight of 3.5 mg/cm$^2$. Its holes 11, which are of square shape and have sides about 16 μm long, are surrounded by areas 12 with a width of 9 μm.

This simple perforated gold foil 10 is provided on one side with a layer 13 of positive photoresist. The layer may be several μm thick. Subsequently, the perforated gold foil 10 is exposed from its free flat side to UV radiation, as is indicated in the figure by a few arrows 14 designated with 14. In this process, the UV radiation decomposes the parts 15 of the photoresist layer 13, which are not covered by the areas 12 of the perforated gold foil 10. After these parts 15 of the resist layer are dissolved away, a corresponding insulating layer 16 remains on the underside of the perforated gold foil 10. According to FIG. 3, a layer 17 of gold or another metal or a suitable semiconductor is subsequently applied on this insulating layer 16, for instance, by vapor deposition. This results in the perforated double layer foil 18 shown in FIG. 3.

Figure 4:
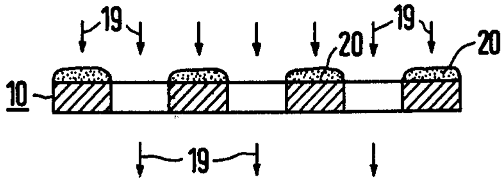
Figure 5:
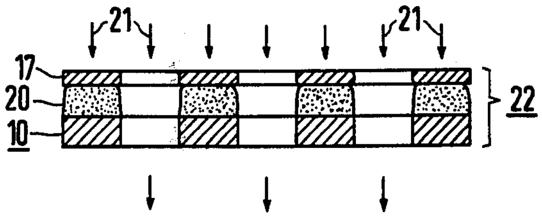

Another possibility for preparing an insulating layer of a perforated double layer foil is indicated in FIGS. 4 and 5. As in FIG. 2, one starts out with a simple perforated gold foil 10. As indicated in FIG. 4 by individual arrows 19, a layer 20 of insulating material can be vapor-deposited or sputtered on the foil 10 on one side. Suitable layer materials are, for instance, $Al_2O_3$, $SiO_2$ or organic polymers. According to FIG. 5, a layer 17 of gold or another metal or a suitable semiconductor is subsequently applied on the insulating layer 20, corresponding to the method according to FIG. 3. To this end, the structure consisting of the perforated gold foil 10 and the insulating layer 20 applied thereon is exposed, for instance, to a jet of gold vapor, as indicated in the figure by individual arrows 21. The perforated double layer foil manufactured by this method is designated a 22 in FIG. 5.

A voltage can now be applied, according to FIG. 1, to the two layers 10 and 17 of electrically conductive material, which are electrically separated from each other, so that the potential gradiant which is required for drawing off the charge carriers produced due to the external photo effect is set up. In this way, the development of an excessive overall potential by the stack arrangement of the individual perforated double layer foils is avoided.

What is claimed is:

1. A photocathode for electroradiographic and electrofluoroscopic apparatus of the ionography type, for absorption of x-rays using the external x-ray photo effect, comprising:

a stack of more than three foils perforated by an array of holes, said foils made of a material with an atomic number of a value on the order of the value of the atomic number of gold, the holes of each of said foils in said stack taking up at least 30% of the total area of the foil, with the space in between adjacent foils being between 5 μm and 5 mm, the thickness of each perforated foil being smaller than 10 times the range of the photoelectrons generated in the foil material and the total thickness of the stack being at least twice the range of the quanta of the incident radiation in the foil material for the radiation with which the photocathode is to be used.

2. A photocathode according to claim 1, wherein the thickness of each perforated foil is smaller than twice the range of the photo electrons.

3. A photocathode according to claim 1, wherein the total thickness of the stack is at least five times the range of the radiation quanta.

4. A photocathode according to claim 1, wherein the spacing is between 10 μm and 1 mm.

5. A photocathode according to claim 1, wherein said transparency is at least 50%.

6. A photocathode according to claim 1, wherein each perforated foil comprises a perforated double layer foil with two outer, electrically conducting layers and an insulating layer in between whereby a predetermined potential gradiant can be established between the two outer layers.

7. A photocathode according to claim 1, wherein said perforated foils are selected from the group comprising of gold plated nickel foils and gold plated copper foils.

* * * * *